March 19, 1935.    L. M. PERSONS    1,994,728
REGULATOR
Filed Dec. 3, 1923    2 Sheets-Sheet 1
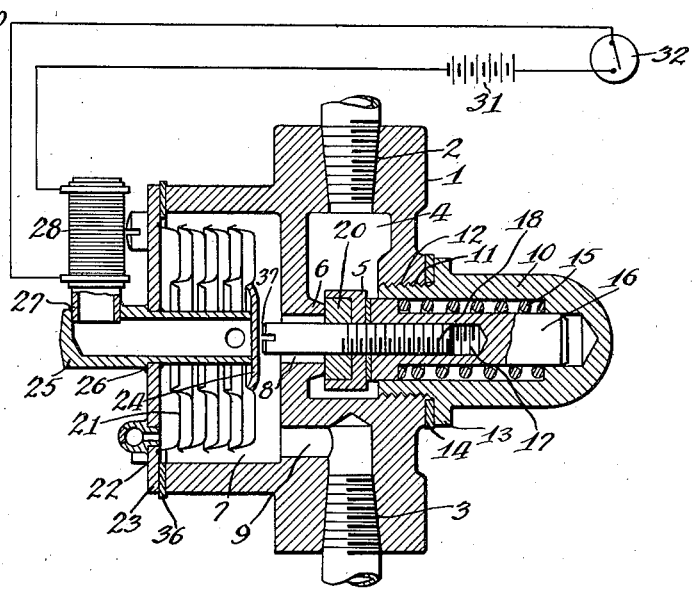
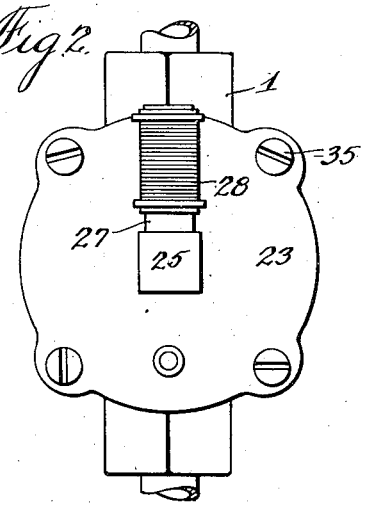
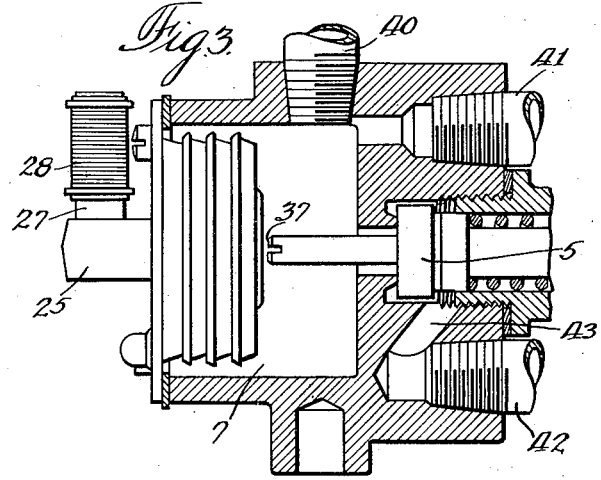
Inventor:
Lawrence M. Persons
By Jones, Addington, Ames & Seibold
Attys.

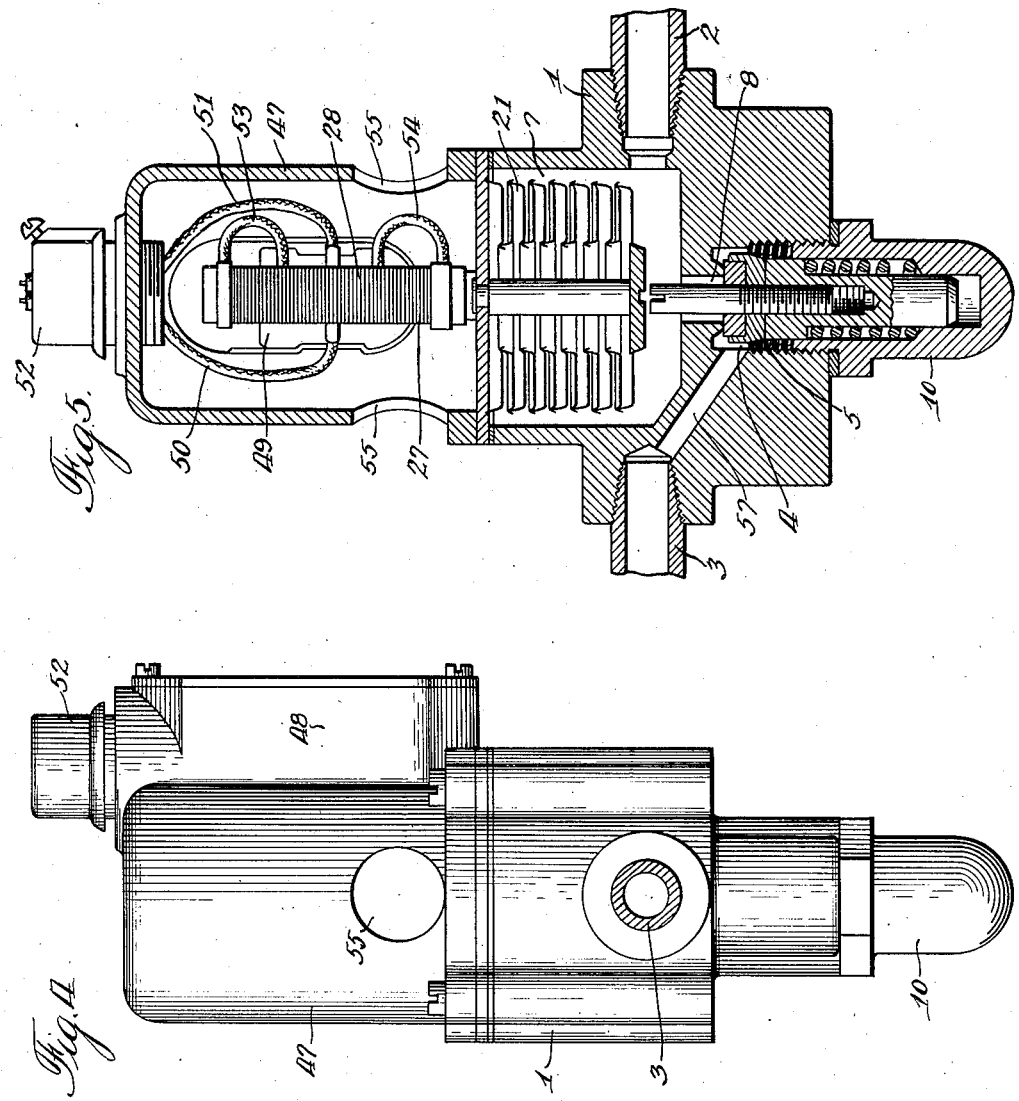

Patented Mar. 19, 1935

1,994,728

UNITED STATES PATENT OFFICE 1,994,728

REGULATOR

Lawrence M. Persons, Chicago, Ill., assignor to Cook Electric Company, Chicago, Ill., a corporation of Illinois Application December 3, 1928, Serial No. 323,312

6 Claims. (Cl. 137—139)

This invention relates to electro-thermostatic devices, or regulators, and, more particularly, to electrically operated vapor motors which employ a volatile fluid for providing the power to operate the control device with which the vapor motor is associated.

The disclosure herein has special reference to the association of a vapor motor with a valve, in a simple and inexpensive manner, being exceedingly practical for a wide range of adaptation and very efficient in operation.

It has heretofore been proposed to provide electro-thermostatic devices for the purpose described comprising a fluid pressure motor or container for a volatile fluid and a heating element in heat-interchanging relation therewith, the latter developing the temperature for vaporizing or expanding the fluid and the motor to operate the control device. Various conditions exist in the practical adaptation of fluid pressure motors. In certain cases, continuous expansion or contraction over a period of several minutes may be required, while, in other cases, expansion or full travel in a fraction of a second may be required. As an example, a longer time is desirable for the control of oil and steam valves, and a shorter time is desirable for certain types of gas valves. This control of the movement of the vapor motor has heretofore been obtained mainly by the insertion of a switch in circuit with the heating element to act as a cut-out when the vapor motor reached full travel or expansion.

Another undesirable feature of the device as heretofore provided has been the failure of the vapor motor to act promptly, or as contemplated, to secure operation within a predetermined time. The arrangement of the switch and the heating element with reference to its relation of heat interchanged with the pressure motor has resulted many times in an undesirable time lag under certain conditions of service. A quick response is essential and if the same cannot be obtained when desired, the vapor motor has little practical use and commercial value. I have found on the other hand that vapor motors have heretofore been built around the device to be controlled and not as a standard unit capable of universal adaptation.

It is an object of this invention to provide an electro-thermostatic device having a vapor motor employing a volatile liquid which utilizes the expansion of the liquid as the power transmitting medium, while avoiding both the sluggishness or time lag of the vapor motor arising from improper relation of the heating element to the vapor motor, and the use of a switch to control the length of travel of the motor, whereby the vapor motor may be produced as a unit and universally adapted to secure the proper timed movement and the power necessary to operate the device to be controlled.

A further object of the invention is to associate this universally adaptable vapor motor to a valve whereby a housing may be provided with oppositely disposed chambers, arranged transversely to the inlet and outlet ports, if so desired, for accommodating the valve and vapor motor, both in readily removable relation, whereby either may be removed for quick inspection and repair, and replacement if so desired.

Another object of the invention is to provide an exceedingly simple and inexpensive construction which is capable of wide adaptation, and which has the vapor motor in direct relation to the valve to avoid any possible lost motion and time lag, if such should occur, for failure of the motor to move its maximum extent within a given time.

My invention further contemplates providing an improved type of vapor or heat motor including an expansible and contractible vessel adapted to contain a volatile fluid therein and having associated therewith a heating device for driving the volatile fluid into the vessel, or otherwise increasing the pressure within by vaporization of the fluid, whereby to expand the vessel, and arranging the vessel within a chamber or bringing it into contact with the fluid or liquid to be controlled so that the volatile fluid in the vessel may be held in a cooled or liquid state to limit the vaporization thereof and a consequent expansion of the vessel.

In order to apprise those skilled in the art how to construct and practice my invention, I shall now describe the preferred embodiment thereof taken in connection with the accompanying drawings which form a part hereof.

In the drawings:

Figure 1 is a vertical sectional view of a device embodying my invention, illustrating, however, the manner of connecting it in a control circuit;

Fig. 2 is an elevation of one end thereof;

Fig. 3 is another embodiment of my invention wherein the inlet and outlet ports are arranged differently;

Fig. 4 is an elevational view of a still further embodiment of my invention; and Fig. 5 is a vertical sectional view of the same.

The invention has special utility when applied to the control of the valve in a fluid system, as illustrated in the drawings, but it is to be expressly understood that the invention is not to be restricted to such use as it is capable of wide application.

Referring in detail to the drawings, 1 indicates a valve casing having aligned ports 2 and 3 for suitable connection with a fluid system. A valve chamber 4 communicates with port 2 and accommodates a valve 5 adapted to cooperate with a seat 6, which communicates with a vapor motor chamber 7 by means of passage 8. A second passage 9 provides communication between chamber 7 and port 3.

A removable cap 10 is externally threaded at 11 to cooperate with an internally threaded opening 12 disposed directly opposite to passage 8. Cap 10 is flanged at 13 to confine a packing washer 14 between the flange and the housing whereby to provide a fluid-tight joint when the cap is tightly threaded into casing 1. Cap 10 is cored to accommodate a coil spring 15 disposed about a slidable member 16 having an internally threaded opening 17 for accommodating a threaded valve stem 18. It will be observed that valve stem 18 is threaded a portion of its length whereby to thread into the opening 17 of member 16 and to receive valve 5. Member 16 is longitudinally movable against the tension of spring 15 within cap 10. Spring 15 tends to hold valve 5 seated, but yields to the opening movement of the valve. Valve 5 is preferably provided in the form of a metallic cup accommodating yieldable material 20 which engages against seat 6 for providing a tight closure of the valve when seated.

In accordance with the present invention, a vapor motor 21 is provided as a unit and inserted and secured in chamber 7, whereby expansion of the motor will afford direct contact with valve stem 18 to open valve 5 against the tension of spring 15. Vapor motor 21 comprises an expansible and contractible vessel in the form of the usual bellows secured at one end, designated 22, to a plate 23. The opposite or movable end 24 of the bellows is closed off and arranged in close proximity to valve stem 18. Plate 23 is centrally bored to accommodate a tube 25 hermetically sealed at 26 to the plate and having a considerable portion extending inwardly within vapor motor 21. The outer end of tube 25 extends, in this instance, far enough to receive a vertical tube 27 carrying a heat coil 28 thereon. As shown in the drawings, heat coil 28 is suitably connected in a control circuit 30 which may include a source of current supply 31 and a control device 32, which may be a thermostat or other suitable instrument.

A volatile fluid is employed in the heat motor and normally extends upwardly into vertical tube 27, but is adapted to be driven into tube 25 and from there into the bellows by the heat developed by the current flow through heat coil 28. The movement of the expanding volatile fluid into the bellows causes expansion of the latter and unseating of valve 5. Obviously, the close relation of the bellows with reference to valve 5 and the positioning of the heat coil whereby to cause the expanding volatile fluid immediately to move into the bellows as the current travels through the heat coil, assures prompt response and immediate expansion of the vapor motor.

Assuming that the current is flowing through the circuit, heat will be developed at the heat coil and as above explained, will drive the volatile fluid into the tube and into the bellows. After the volatile fluid is driven out of the heat zone in heating tube 27, the fluid is no longer subject to the influence of the heat, and therefore does not continue to vaporize.

While I do not intend to be limited to the use of any special material in the construction of my device, it may be stated that I contemplate making tube 27 of steel which has a low heat conductivity and does not tend to conduct or transfer heat longitudinally therealong. I find that the conduction of heat is effectively prevented beyond the connection between tube 27 and tube 25. Consequently, it is not necessary to employ a switch to open the circuit 30 after the bellows has unseated valve 5 inasmuch as the continuously closed circuit fails to produce further expansion of the bellows.

On the other hand I find that it is not necessary to rely upon the expansion or movement of the volatile fluid out of the heat zone into bellows 21 to limit the expansion of the latter. It is obvious that the fluid, whether a gas or a liquid, flowing through chamber 7, will maintain the volatile fluid within bellows 21 sufficiently cool to keep it in a liquid state. If held in a liquid state, further vaporization is prevented beyond tube 27, or possibly connection 25, so that the pressure is prevented from increasing. Consequently, further expansion of bellows 21 is prevented. It is here mentioned that this construction whereby the expansion of the heat motor is limited by allowing the fluid in chamber 7 to cool the volatile fluid, is believed to be new and accordingly will be broadly claimed.

It is also found that arranging tube 27 and connection 25 in the position shown in Figs. 1 and 3 permits air trapped in the upper end of tube 27, during the sealing, to be led through connection 25 and into bellows 21, by tilting it after sealing, where the air will permanently remain. This is advantageous because air in tube 27 will delay heating and vaporization of the volatile fluid and cause irregularity in the expanding action of the bellows.

It is obvious that the current consumption at heat coil 28 will control the pressure which may be exerted by the expansion of the volatile fluid in the bellows. I find, for instance, that with a 10-watt current consumption, a pressure of 20 pounds is exerted over a $\frac{1}{16}$ inch travel of the bellows, while 30-watt current consumption exerts a pressure of 200 pounds over a travel of ½-inch. The vapor motor can be arranged to produce any desired amount of power whereby to impart different pressures at different travels. It will be observed in the device herein disclosed, no friction is created by the moving parts, and therefore, these parts do not require lubrication or attention. In the absence of any wearing parts, the device will last indefinitely and is noiseless in operation.

The various characteristics of the vapor motor are determined from the requirements desired. The vapor motor may have continuous expansion or contraction for a period of several minutes in order to complete its stroke or it may go through its full travel in a fraction of a second after a predetermined time. Such functioning of the vapor motor is obtained by the position of the heat coil on tube 27 and its current consumption.

Moreover, it will be observed that the vapor motor is arranged as a unit, being secured to plate 23 and attached to the valve casing 1 by means of screws 35. A fluid tight joint is obtained by means of packing 36 interposed between the casing and plate 23. The removal of the screws 35 permits quick and ready access to chamber 7 and complete removal of the vapor motor as a unit therefrom, if so desired.

Access to valve 5 is quickly obtained by removing cap 10. Heretofore, in devices of this type, access to the valve has been difficult. In the present device such access to the valve is obtained as cap 10 is removed and the member 16 backed off the threaded end of valve stem 18. Relative adjustment is furnished between valve 5 and the stem whereby to bring the forward end 37 of the valve stem any desired distance from the movable end 24 of bellows 21. The distance between end 37 of valve stem 18 and the movable end 24 of bellows 21 determines the initial period of heating of the fluid in the bellows before effectively operating to unseat valve 5. Obviously, if end 37 of valve stem 18 is in close proximity to the movable end 24 of the bellows, the valve 5 will be immediately unseated as the current flows through the heat coil 28. This adjustment is highly desirable inasmuch as it is desirable to control the opening period of valve 5 in many installations.

The arrangement of the vapor motor in connection with the valve disclosed herein is simple and inexpensive to maintain and has a wide field of adaptation. It will be observed that a simple electric circuit is the only source of power required to operate the valve. This circuit need not require large current, inasmuch as the current consumption at the coil may be as low as 10 watts, or so. Circuit 30 may be connected as part of any control circuit intended to control the fluid system in which valve 5 is inserted.

The device shown in Fig. 3 is substantially the same as that shown in Figs. 1 and 2. I have arranged the pipe connections leading to casing 1 slightly differently which results, of course, in a different arrangement of the parts of this casing. Chamber 7 is slightly larger, while the forward end 37 of valve stem 18 projects a greater distance thereinto. Pipes 40, 41 and 42 may be connected in the system in different ways so that pipes 40 and 41 may be the inlet connections, while pipe 42 may serve as the outlet connection. If so desired, this arrangement may be reversed so that pipe 42 is the inlet connection and pipes 40 and 41 are the outlet connections. Valve chamber 4 communicates directly with pipe 42 by means of a passage 43. Valve 5 seating within chamber 4 is controlled by the heat motor in chamber 7 in the same manner.

Figs. 4 and 5 illustrate another commercial form of the invention. Chamber 7 accommodates the heat motor or bellows 21 in the same manner as in the previous illustrations, this heat motor having, however, the heating tube 27 connecting directly to and in alignment with the axis of the bellows. A suitable casing 47 is attached to valve casing 1 for receiving heat tube 27. A conduit box 48 may be integrally formed with housing 47 for receiving a terminal block 49, to which are connected the line wires 50 and 51 leading inwardly through a boss 52. Wires 53 and 54 may connect from terminal block 49 to the heat coil 28 on tube 27. Oppositely arranged openings 55 in housing 47 allows a circulation of air to keep heat coil 28 properly cooled while the circuit is closed. In this embodiment either the inlet or the outlet connection may communicate directly with chamber 7 as distinguished from the arrangement shown in Fig. 1. It is apparent that the gas or liquid controlled by the mechanism will be permitted freely to flow about bellows 21 in order to maintain the volatile or vapor sensitive fluid therein in liquid state so as to check the expansion of the bellows. Valve 5 and its cooperating parts are of substantially the same construction as in the forms previously described. Valve chamber 4 connects with pipe 3 by passage 57 and with chamber 7 by the passage 8. Pipe 2 directly connects with chamber 7, but it will be understood, of course, that these pipe connections may be varied according to the requirements of the installation.

While the embodiments of the invention illustrated in the drawings have been described with considerable particularity, it is to be expressly understood that the invention is not restricted thereto, as the same is capable of receiving a variety of mechanical expressions, some of which will readily suggest themselves to those skilled in the art, while certain features thereof are capable of use without other features thereof. Reference is therefore to be had to the claims hereto appended for a definition of the limits of the invention.

I claim:

1. In controlling means for a valve, the combination of a casing having a valve chamber and a seat therein for said valve, a removable unit including said valve and a holder therefor arranged to be detachably mounted exteriorly of said casing, a stem for actuating said valve, means carried by said holder adjustably receiving one end of said stem, the opposite end of said stem projecting through said seat, a motor chamber into which said opposite end of said stem projects, a motor for operating said stem, and a closure for one side of said motor chamber removably carrying said motor therein.

2. In controlling means for a valve, the combination of a casing having a chamber for said valve, a seat in said chamber, a removable mounting for said valve including a stem arranged for axial adjustment, a motor chamber into which said stem projects in adjustable relation, a motor for operating said stem, said motor chamber being oppositely disposed with respect to said seat, and a closure for one side of said motor chamber, said closure and said motor being arranged as a removable unit.

3. In controlling means for a valve, the combination of a casing having a chamber for said valve, a seat in said chamber, a removable mounting for said valve including a stem arranged for axial adjustment, a motor chamber into which said stem projects in adjustable relation, an expansible motor for operating said stem, said motor chamber being oppositely disposed with respect to said seat, and a closure for one side of said motor chamber, said closure and said motor being arranged as a removable unit, the adjustment of said stem providing means for predetermining the expansion of said motor necessary before initial operation of said stem.

4. In combination with a valve casing having inlet and outlet ports and an apertured partition dividing the casing into two chambers, each chamber communicating with one of the ports, a valve and a seat therefor in one chamber, a motor for operating said valve in the other chamber, a mounting for said valve including means for yieldably holding said valve seated, and an axially adjustable member extending into said other chamber for actuating engagement by said motor whereby to unseat and hold said valve open, and a mounting for said motor, both said valve mounting and said motor mounting being removable from said casing independently of each other and exteriorly of said casing at opposite sides.

5. In combination with a valve casing having inlet and outlet ports and an apertured partition therein, said partition being between said ports to separate said casing into inlet and outlet chambers, a valve in said inlet chamber, a valve seat on said apertured partition, a removable mounting for said valve including a cap removable exteriorly of said casing, a member carrying said valve arranged in telescoping relation with said cap, and a spring between said cap and said member for urging said valve upon said seat, an extension in adjustable relation on said telescoping member, said extension projecting through the aperture of said partition to lie in said outlet chamber, a motor disposed in actuating relation with said projecting extension, and a closure for one side of said outlet chamber, said closure and said motor being arranged as a removable unit.

6. In combination with a valve casing having inlet and outlet ports and an apertured partition dividing the casing into two chambers, a valve and a seat therefor in one chamber, a motor for operating said valve in the other chamber, a removable mounting for said valve including a cap removable exteriorly of said casing, said cap having an exteriorly threaded shank engaging an interiorly threaded opening in said casing in axial alignment with said valve and aperture, a member in telescoping relation with said cap, a concentrically arranged spring for urging said valve upon said seat, said spring being held in position by said cap, said telescoping member having a threaded opening therein, a threaded stem adjustably carried in said threaded opening and extending through said valve, said stem extending into said motor chamber for actuating engagement by said motor, and a closure for one side of said motor chamber, said closure and said motor being removable from said casing.

LAWRENCE M. PERSONS.